Figure 3:
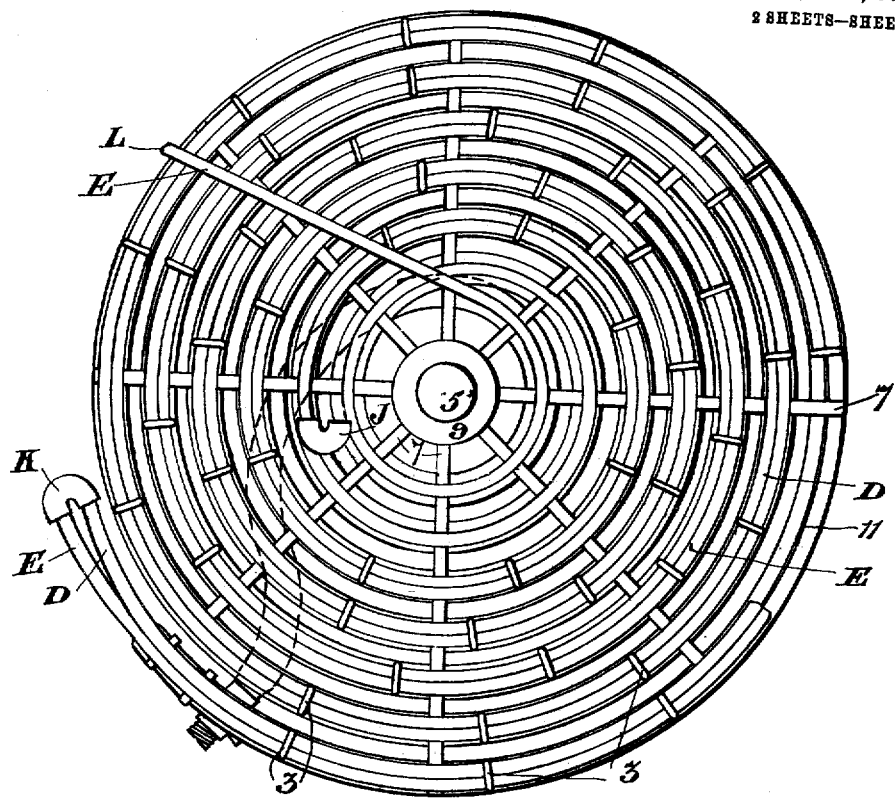

W. M. TAYLOR.
WATER COIL.
APPLICATION FILED AUG. 8, 1908.
916,936.
Patented Mar. 30, 1909.
2 SHEETS—SHEET 1.
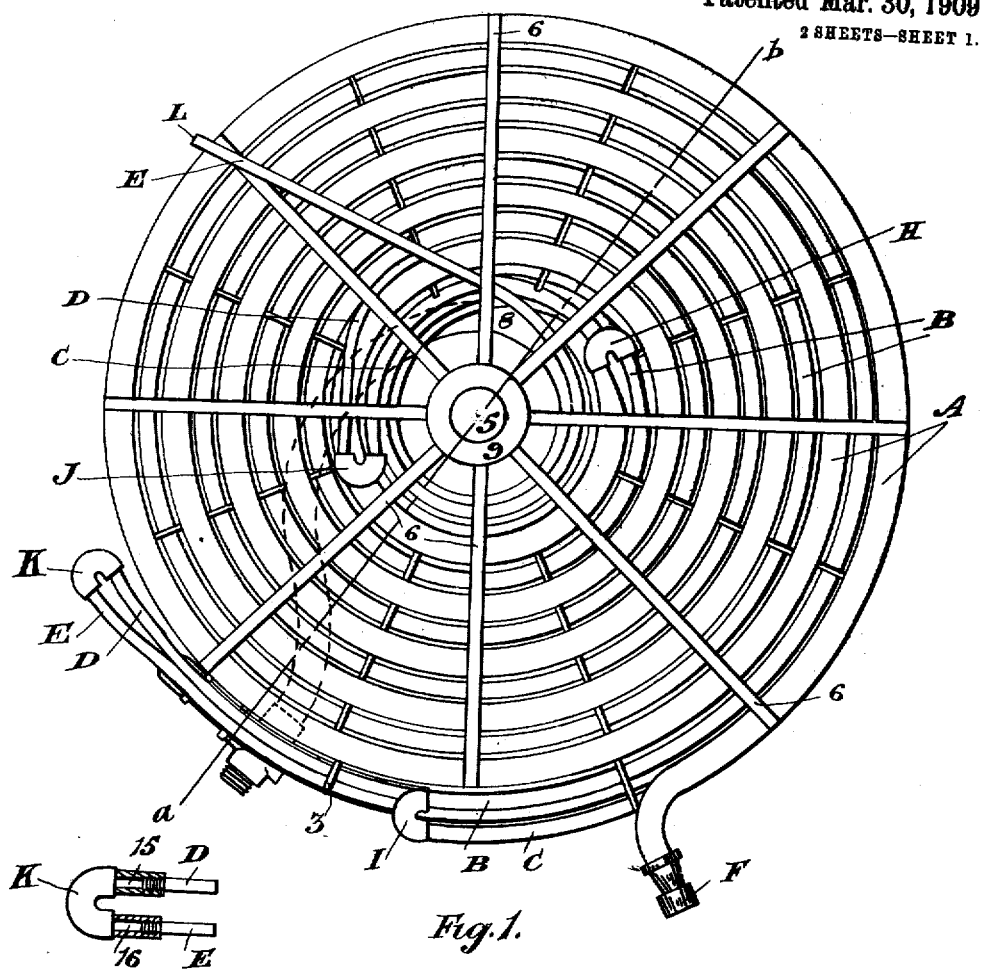
Fig. 1.
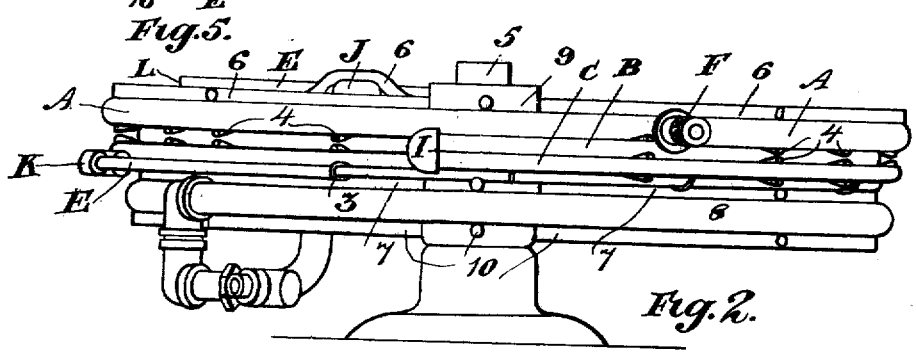
Fig. 5.
Fig. 2.
Witnesses.
Wm. S. Jordan
N. Langfield
Inventor.
W. M. Taylor,
by Luther R. Case,
Atty.

W. M. TAYLOR.
WATER COIL.
APPLICATION FILED AUG. 8, 1908.

916,936.

Patented Mar. 30, 1909.
2 SHEETS—SHEET 2.

Witnesses.
Wm. S. Jordan.
N. Lampfield.

Inventor.
W. M. Taylor.
by Hector R. Case
Atty.

UNITED STATES PATENT OFFICE.

WALTER MARTIN TAYLOR, OF TORONTO, ONTARIO, CANADA, ASSIGNOR TO FREDERICK WILLIAM COX AND JOHN BISSET, TRUSTEES, OF TORONTO, CANADA.

WATER-COIL.

No. 916,936.        Specification of Letters Patent.        Patented March 30, 1909.

Original application filed September 16, 1907, Serial No. 393,135. Divided and this application filed August 8, 1908. Serial No. 447,606.

*To all whom it may concern:*

Be it known that I, WALTER MARTIN TAYLOR, a subject of the King of Great Britain, residing in the city of Toronto, in the county of York, Province of Ontario, Canada, have invented certain new and useful Improvements in Water-Coils, of which the following is a specification.

My invention relates to improvements in water-coils, and the present application is divided from my original application for improvements in water-heaters or steam-generators, filed September 16, 1907, under Serial #393135, and the objects of my invention, are: firstly, to construct a water-coil as shallow as possible so that the water-coil-units thereof will be directly in the zone of the flame issuing from any suitable burner; secondly, to construct the water-coil so as to equalize the pressure of the water throughout the length thereof so that the water passing therethrough will not ordinarily be converted into steam, thus enabling my apparatus to be used for the purpose of heating water, and thirdly, to construct a light portable water-coil so that it may be readily carried to wherever it is desired to use it.

Although I preferably use my water-coil in connection with a coiled gas-burner, still it will be understood that my water-coil may be used in connection with any kind of heater. But as gas-burners are almost universally used for the purpose of heating water, I have specially designed my water-coil to be used therewith, so that the water-coil-units of the water-coil by reason of the shallow construction of the same, will be within the flame-zone, thus enabling me to heat the water in a very short space of time, because the actual flame from the burner envelops the whole of the water-coil. In water-coils now on the market in which water is heated, very few of the coil-units are directly within the flame-zone, and consequently the water is heated in the coil-units above the flame-zone by reason of the heat escaping therefrom: needless to say this method of heating water requires more time and fuel than is necessary.

My water-coil is composed of concentrically coiled pipe-units or water-coil-units, the coils of each individual pipe-uint, or water-coil-unit being in substantially a horizontal plane, and being spaced apart so that the coils of each alternate pipe-unit or water-coil unit will extend a suitable distance into the space of the pipe-units or water-coil-units immediately above and below, thereby enabling me to make my water-coil very shallow and compact, for the purpose before set forth.

From the following specification it will be understood that as the water passes from one horizontal pipe-unit or water-coil unit into another, the direction of its flow is reversed, and this occurs several times before the water passes completely through the water-coil, thus absolutely insuring the heating of the water to the desired degree.

Figure 4:
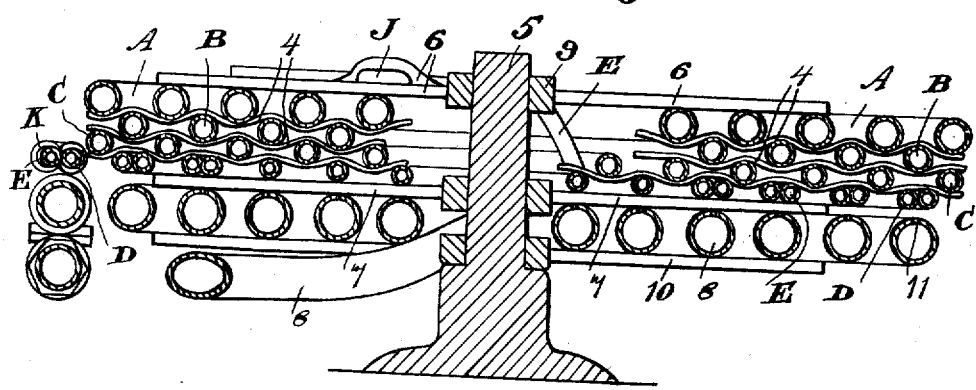

Figure 1 is a plan-view of my preferred form of water-coil, and Fig. 2 is a side elevation thereof. Fig. 3 is a plan-view of my water-coil (the three upper pipe-units or water-coil-units having been removed) showing how the lowermost unit of the water-coil is supported directly above the gas-burner and for its whole heat-producing length. Fig. 4 is a vertical cross-section somewhat enlarged on the line a—b Fig. 1, and Fig. 5 is a detail view, showing partly in section an alternative form of coupling for the water-coil-units.

In the drawings, like characters of reference indicate corresponding parts in each figure.

The burner I preferably use is constructed of a coiled pipe or tube. The lowermost pipe-unit or water-coil-unit is placed directly over the gas aperture in the said gas-burner; and this position of the same, together with the before-described preferred position of the pipe-units or water-coil units, enables me to deflect or turn aside the gas-flame so that it will envelop all the pipe-units or water-coil-units of the water-coil.

Although in the drawings I show two pipe-units or water-coil-units placed side by side for a certain length, immediately above the gas-burner, I do not confine myself to using these twin pipe-units or water-coil units, as will be readily understood. By using these twin pipe-units, I increase the area of the pipe-unit or water-coil-unit immediately above the gas-burner, and also cause the flowing water to flow backward in a path above, but substantially the same as, the coil of the gas-burner, thus positively heating the water to boiling point in case it should not be heated by merely one small pipe-unit.

The pipe-units or water-coil-units are made of pipes which have a smaller cross-section than the pipes immediately above and below, the smallest pipe in cross-section being that immediately above the gas-burner. By this construction I equalize the pressure of the water throughout the length of the water-coil and give the water the desired speed to prevent its conversion into steam, and the cross-section of the stream of water gradually decreases the nearer it approaches the gas-burner, thus enabling me to very quickly heat the same.

A is the first pipe-unit, or water-coil unit (for the sake of brevity I will call the different water-coil-units, pipe-units); B is the second pipe-unit; C the third pipe-unit; D the fourth pipe-unit, and E the fifth pipe-unit; there being five pipe-units in the water-coil shown. It will be noticed that the pipes composing the said pipe-units decrease in cross-sectional area in the pipe-units from A to E so as to give me the advantages before set forth. The said pipe-units are composed of coiled pipes, as before set forth, with sufficient space between the coils of each pipe-unit so that the coils of the pipe-units immediately above and below will extend a suitable distance into the spaces between the coils of the adjacent pipe-units, thus giving me a very compact water-coil, the coils of the pipe-units of which are most advantageously placed, the result being that all the water-coil-units are well within the flame-zone.

As the pipe-units of the water-coil are constructed, the water enters the pipe-unit A by the end F and circulates therethrough to the pipe-unit B, coupled thereto by any suitable coupling H, and flows in the reverse direction through the pipe-unit B into the pipe-unit C coupled thereto by any suitable coupling I. Through the pipe-unit C the water flows in the reverse direction into the pipe-unit D coupled thereto by any suitable coupling J, and flows in the reverse direction through the pipe-unit D into the pipe-unit E coupled thereto by any suitable coupling K, and then flows in the reverse direction through the pipe-unit E passing from the discharge end L thereof heated to boiling point. By following the course of the water through the different pipe-units as just described, it will be understood that the water flows in a substantially horizontal plane, and its direction of flow is reversed each time it passes from one pipe-unit into another. When I use the two pipe-units D and E, I secure the same in juxtaposition by any suitable means, such as metallic bands 3 passed around both at suitable intervals.

4 are a plurality of metallic spacers bent into proper shape and placed between the pipe-units of the water-coil so as to maintain the same in proper position.

5 is a central supporting post provided with a plurality of radiating rods 6 which rest upon the top of the pipe-unit A.

7 are a plurality of rods radiating from the supporting post 5 and resting upon the gas-burner 8; the pipe-units D and E rest upon the rods 7. By means of the collar 9 on the supporting post 5, the radiating arms 6 can be moved so that the different pipe-units will be snugly held in position.

10 are a plurality of radiating arms supported by the said post and upon which rest the gas-burner 8. By means of the said radiating arms 10, it will be understood that the gas-burner will be held in a set relationship to the water-coil.

I find that I get best results by supporting the pipe-units D and E a certain distance above the gas-burner 8 so that they will be situated in the hottest part of the flame above the orifice 11 of the gas-burner. Furthermore, by supporting the said pipe-units the proper distance from the gas-burner, I prevent the flame from getting smothered and thus prevent the generation of any disagreeable odor. It will be noticed that the coils of the burner will be spaced apart thus allowing for ventilation.

Upon referring to Fig. 5 will be seen an alternative form of coupling for the different pipe-units. 15 is a nipple screwing over the outer coupling end, for instance, of the pipe composing the pipe-unit D, and screwing into the coupling K. 16 is a nipple screwing over the outer coupling end of the pipe composing the pipe-unit E and also screwing into the coupling K.

What I claim as my invention is:

1. A water-coil consisting of a plurality of coiled pipe-units individually occupying a substantially horizontal plane, the cross sectional area of the pipe forming each pipe-unit being less than the cross sectional area of the pipe forming the preceding pipe-unit; the outer end of a given pipe-unit being connected to the pipe-unit above, and the inner end of the said given pipe-unit being connected to the pipe-unit below, the coils of each pipe-unit being spaced apart, and the different pipe-units being so associated that the coils thereof will extend into the said space between the coils of the pipe-units immediately above and below; a centrally placed supporting member for said water-coil; spacers between the said several pipe-units, and means carried by said post for retaining the said pipe-units in relative position.

2. A water-coil consisting of a plurality of coiled pipe-units individually occupying a substantially horizontal plane, the cross sectional area of the pipe forming each pipe-unit being less than the cross sectional area of the pipe forming the preceding pipe-unit; the outer end of a given pipe-unit being connected to the pipe-unit above, and the inner end of the said given pipe-unit being connected to the pipe-unit below, the coils of each pipe-unit being spaced apart, and the different pipe-units being so associated that the coils thereof will extend into the said space between the coils of the pipe-units immediately above and below; a centrally placed post; a plurality of spacers between the said several pipe-units; a plurality of rods carried by said posts and supporting said water-coils, and a plurality of rods carried by said post resting upon the uppermost water-pipes, thereby retaining the said pipe-units in relative position.

In testimony whereof I have signed my name to this specification, in the presence of two subscribing witnesses.

WALTER MARTIN TAYLOR.

Witnesses:
N. LANGFIELD,
WM. S. JORDAN.